(12) United States Patent
Takizawa et al.

(10) Patent No.: US 11,264,880 B2
(45) Date of Patent: Mar. 1, 2022

(54) PERMANENT MAGNET MOTOR

(71) Applicant: Mitsubishi Electric Corporation, Tokyo (JP)

(72) Inventors: Yuji Takizawa, Tokyo (JP); Hiroko Ikeda, Tokyo (JP); Shinichi Yamaguchi, Tokyo (JP); Yu Hirotani, Tokyo (JP); Masafumi Okazaki, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 16/961,959

(22) PCT Filed: Feb. 28, 2018

(86) PCT No.: PCT/JP2018/007450
§ 371 (c)(1),
(2) Date: Jul. 14, 2020

(87) PCT Pub. No.: WO2019/167160
PCT Pub. Date: Sep. 6, 2019

(65) Prior Publication Data
US 2021/0075305 A1    Mar. 11, 2021

(51) Int. Cl.
*H02K 1/27* (2006.01)
*H02K 21/14* (2006.01)
(Continued)

(52) U.S. Cl.
CPC ............ *H02K 29/03* (2013.01); *H02K 1/276* (2013.01); *H02K 21/14* (2013.01)

(58) Field of Classification Search
CPC ........ H02K 29/03; H02K 1/276–27/66; H02K 21/14
See application file for complete search history.

(56) References Cited

U.S. PATENT DOCUMENTS

2013/0140933 A1    6/2013 Katsuhisa et al.
2015/0280500 A1*  10/2015 Nigo ..................... H02K 21/16
                                                                310/156.53
(Continued)

FOREIGN PATENT DOCUMENTS

JP     2003-23740 A     1/2003
JP     2004-336999 A    11/2004
(Continued)

OTHER PUBLICATIONS

Communication dated Jun. 27, 2021, issued by the Intellectual Property Office of India in application No. 202027027862.
(Continued)

*Primary Examiner* — Thomas Truong
(74) *Attorney, Agent, or Firm* — Sughrue Mion, PLLC; Richard C. Turner

(57) ABSTRACT

A permanent magnet motor includes a rotor having a field pole of a rotor core, wherein the field pole has a radius smaller than an arc centered on a shaft of the rotor, a multiple of slits are formed in the field pole, the multiple of slits are disposed so that an interval between a first central line positioned between a multiple of the slits and a second central line positioned between a neighboring multiple of the slits increases as the first central line and the second central line head toward an outer peripheral side of the rotor core, and of the multiple of slits of the field pole, a first slit disposed in a central position of the field pole, and a second slit and a third slit disposed on either side of the first slit, are disposed within 20% of a circumferential direction width of the permanent magnet.

11 Claims, 16 Drawing Sheets

(51) Int. Cl.
*H02K 29/03* (2006.01)
*H02K 1/276* (2022.01)

(56) References Cited

U.S. PATENT DOCUMENTS

| | | | |
|---|---|---|---|
| 2016/0172913 A1* | 6/2016 | Baba | H02K 1/2766 417/410.3 |
| 2016/0181877 A1 | 6/2016 | Ishikawa et al. | |
| 2018/0048209 A1 | 12/2018 | Baba | |

FOREIGN PATENT DOCUMENTS

| | | |
|---|---|---|
| JP | 2006-014450 A | 1/2006 |
| JP | 2006-081336 A | 3/2006 |
| JP | 2013-118788 A | 6/2013 |
| JP | 2013-126291 A | 6/2013 |
| JP | 2014-093852 A | 5/2014 |
| WO | 2015/045027 A1 | 4/2015 |
| WO | 2016/203563 A1 | 12/2016 |

OTHER PUBLICATIONS

International search report for PCT/JP2018/007450 dated May 22, 2018.
Office Action dated Aug. 3, 2021 in Japanese Application No. 2020-503154.
European Search Report dated Feb. 1, 2021 in Patent Application No. 18908031.0.

* cited by examiner

PERMANENT MAGNET MOTOR

CROSS-REFERENCE TO RELATED APPLICATIONS

This application is a National Stage of International Application No. PCT/JP2018/007450 filed Feb. 28, 2018, the disclosure of which is incorporated herein in its entirety by reference.

TECHNICAL FIELD

The present application relates to a permanent magnet motor.

BACKGROUND ART

To date, with regard to a rotor of a permanent magnet motor, slits aligned so that neighboring intervals are practically equal have been provided in a rotor core surface of an IPM (interior permanent magnet) motor in order to improve demagnetization resistance of a permanent magnet (for example, refer to Patent Literature 1).

Also, with regard to a magnet-embedded rotor of an existing motor, slits inclined in one direction of rotation are provided in a rotor core surface of an IPM motor in order to reduce torque ripple (for example, refer to Patent Literature 2).

The previously described kinds of existing IPM motors have a main object of achieving an improvement in demagnetization resistance or a reduction of torque ripple. In the case of demagnetization resistance improvement, there is no need to adopt a complicated structure wherein slits are provided in a rotor surface as disclosed in Patent Literature 1, as it is sufficient to apply a permanent magnet with a high coercive force. Also, in the case of torque ripple reduction, a structure having the kind of perfectly circular external rotor form disclosed in Patent Literature 2 is a form such that torque ripple worsens, so is not appropriate.

Generally, an IPM has greater demagnetization resistance than a surface permanent magnet (SPM), and reluctance torque can be utilized, because of which a small motor with a high output can be realized by increasing an amount of current, thereby increasing torque density.

CITATION LIST

Patent Literature

Patent Literature 1: JP-A-2006-081336
Patent Literature 2: JP-A-2006-014450

SUMMARY OF INVENTION

Technical Problem

In this case, differing from an SPM, an IPM is such that a face opposing a stator inner diameter forms a rotor core with high magnetic permeability, because of which a magnetic flux that crosses a magnetic pole surface in a circumferential direction increases, and an air gap magnetic flux density is more liable to become locally excessive compared with an SPM.

An existing permanent magnet motor is such that due to a local increase in magnetic flux density in an air gap, an electromagnetic excitation force proportional to two times the magnetic flux density acts, attempting to cause a stator to transform, because of which there is a problem in that motor vibration noise worsens. As reducing the motor current or enlarging the air gap causes the torque density to decrease, the advantages of reducing size and increasing output with respect to an SPM are cancelled out.

The application discloses technology for resolving the heretofore described kind of problem, and has an object of providing a permanent magnet motor such that a worsening of motor vibration noise can be restricted while securing a reduction in size and an increase in output, which are advantages of an IPM.

Solution to Problem

A permanent magnet motor disclosed in the present application includes a stator, and a rotor disposed opposing an inner side of the stator and having a field pole of a rotor core in which a permanent magnet is embedded, wherein the field pole has a radius smaller than an arc centered on a shaft of the rotor, a multiple of slits are formed in the field pole, the multiple of slits are disposed so that an interval between a first central line positioned between a multiple of the slits and a second central line positioned between a neighboring multiple of the slits increases as the first central line and the second central line head toward an outer peripheral side of the rotor core, and of the multiple of slits of the field pole, a first slit disposed in a central position of the field pole, and a second slit and a third slit disposed on either side of the first slit, are disposed within 20% of a circumferential direction width of the permanent magnet.

Advantageous Effects of Invention

According to the permanent magnet motor disclosed in the present application, a permanent magnet motor such that a worsening of vibration noise of a motor can be restricted, while securing a reduction in size and an increase in output, which are advantages of an IPM, is obtained.

BRIEF DESCRIPTION OF DRAWINGS

FIG. 6A to FIG. 6C are plotted, with a vertical axis as electromagnetic excitation force and a horizontal axis as a torque ripple value.

DESCRIPTION OF EMBODIMENTS

Figure 1:
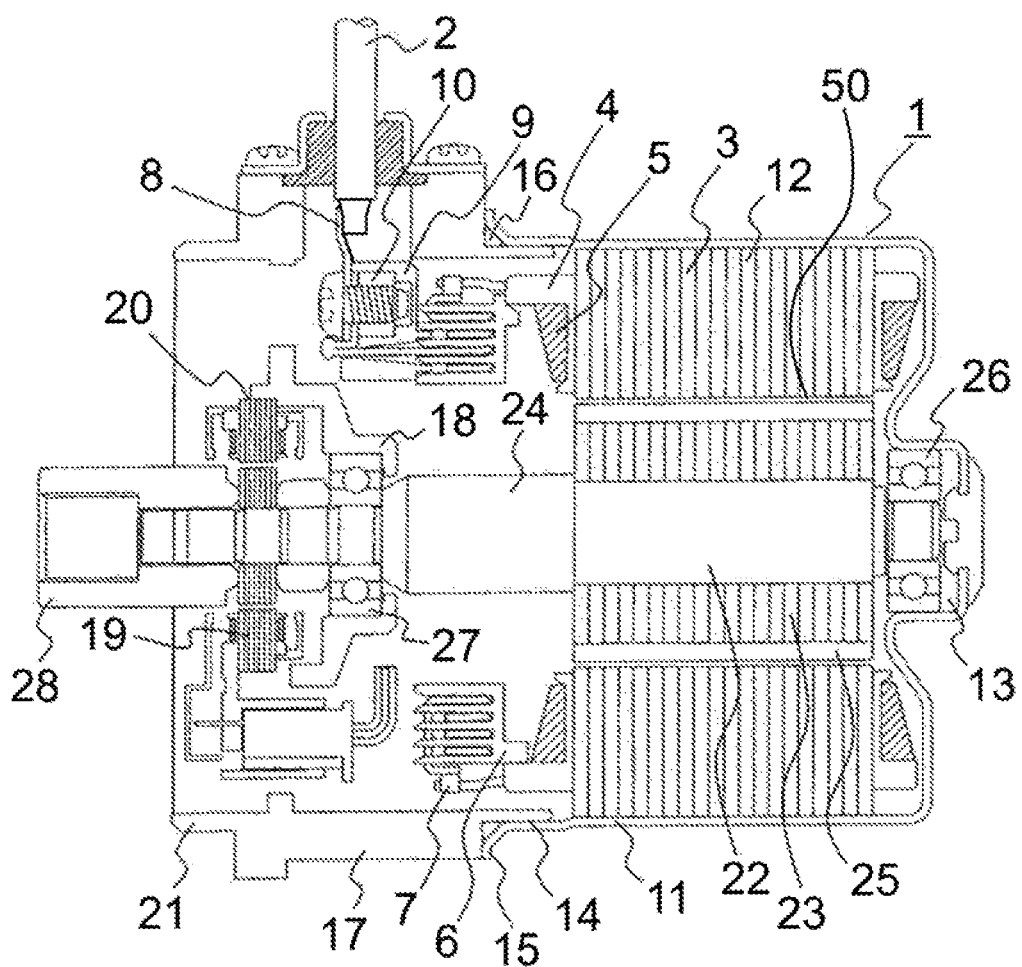
FIG. 1 is an axial direction sectional view of a permanent magnet motor according to a first embodiment.

Hereafter, a first embodiment will be described, based on the drawings.

Identical reference signs in the drawings indicate identical or corresponding components.

First Embodiment

FIG. 1 is an axial direction sectional view of a permanent magnet motor according to the first embodiment. The permanent magnet motor according to the first embodiment is used in, for example, an electric power steering system.

As shown in FIG. 1, a permanent magnet motor (hereafter referred to simply as "motor") 1 includes a rotor 22 having a rotor core 23 in whose interior a multiple of permanent magnets 25 are disposed, and supported so as to rotate freely, and a stator 12 provided across an air gap 50 on an outer side of the rotor 22. Also, the stator 12 includes a stator core 3 and a stator winding 5.

The stator core 3 is formed by, for example, plate-form electromagnetic steel sheets being stacked, and the three-phase stator winding 5 is wound around the stator core 3 across an insulator 4 made of resin. The stator windings 5 of each phase are delta-connected by a winding terminal 7 housed in a terminal holder 6 made of resin. Furthermore, a connection terminal 8 for connecting to a lead wire 2 is attached to the winding terminal 7 of each phase. The connection terminal 8 is attached to a connection terminal base portion 9, and a nut 10 for attaching the lead wire 2 to the connection terminal 8 is housed in an interior of the connection terminal base portion 9.

The stator core 3 is press-fitted into a frame 11 made of iron, forming the stator 12 of the motor 1. There is a bottom portion in one end portion of the frame 11, and a rear bearing box portion 13 that houses a rear bearing 26 for supporting one end of the rotor 22 is formed in a central portion of the bottom portion. Another end portion of the frame 11 is opened, and a spigot joint portion 14 for linking to a housing 17 of the motor 1 is formed. A flange portion 15 having a screw clamping portion for screwing the stator 12 to the housing 17 of the motor 1 is formed on an outer periphery of the spigot joint portion 14 of the frame 11. An O-ring-form frame grommet 16 for waterproofing is provided between the housing 17 of the motor 1 and the flange portion 15 of the stator 12.

The housing 17 of the motor 1 is formed by a die casting of an aluminum alloy, and a front bearing box 18 that houses a front bearing 27 for supporting one end of the rotor 22 is formed in a central portion. Also, a resolver mounting portion 20 for attaching a resolver 19, which is a rotation sensor for detecting an angle of rotation of the rotor 22, is formed in a vicinity of the front bearing box 18 of the housing 17. A mounting spigot joint portion 21 for attaching the motor 1 to a mating instrument is provided in an end portion of the housing 17 on a side opposite to a side on which the stator 12 is attached.

The rotor 22 includes the rotor core 23, which is formed by electromagnetic steel sheets attached to an iron shaft 24 being stacked. Further, either end of the shaft 24 is supported by the rear bearing 26 and the front bearing 27 so as to rotate freely. A boss 28, which is coupling for linking to a mating instrument, is attached to a front side end portion of the shaft 24.

Figure 2A:
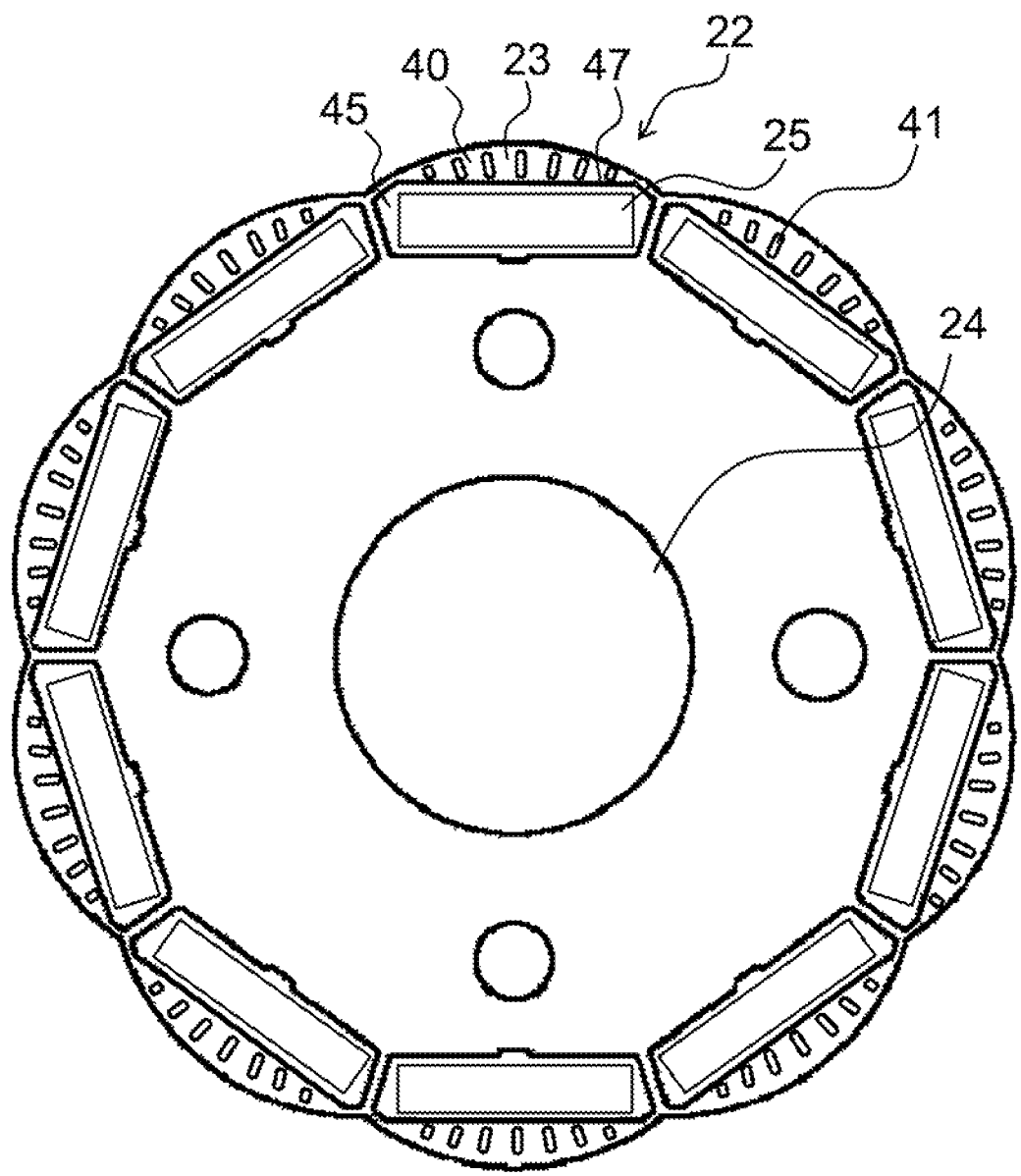
FIG. 2A is a front view of a rotor of the permanent magnet motor according to the first embodiment.
Figure 2B:
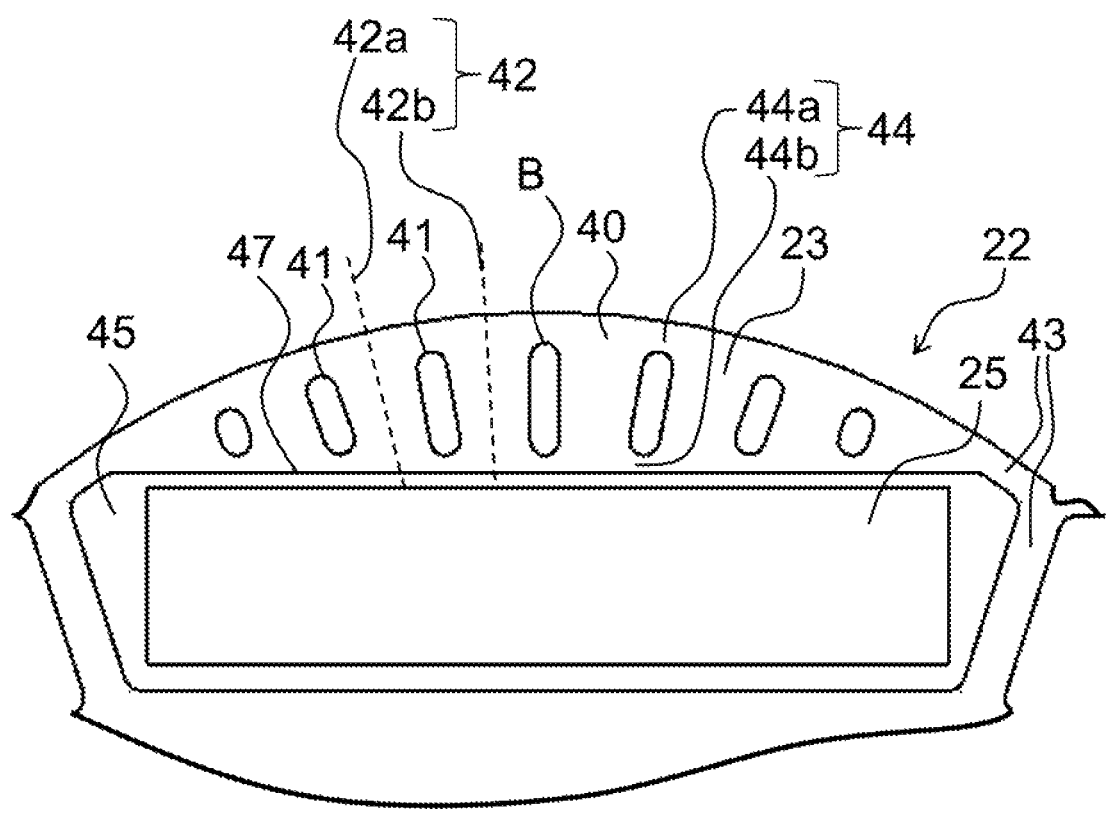
FIG. 2B is a front view of the rotor of the permanent magnet motor according to the first embodiment.

FIG. 2A and FIG. 2B are front views of a rotor of a permanent magnet motor according to the first embodiment. Also, FIG. 2B is an enlarged view of FIG. 2A. As shown in FIG. 2A and FIG. 2B, the multiple of permanent magnets 25 are embedded in a circumferential direction in the rotor core 23 of the rotor 22. The multiple of permanent magnets 25 are housed and fixed in a multiple of permanent magnet mounting holes 47 disposed at equal intervals in the circumferential direction in the rotor core 23, and a gap portion 45 is formed on either side of the permanent magnet 25. FIG. 2A and FIG. 2B are centered on the rotor 22. Therefore, a depiction of the stator 12 provided across the air gap 50 on an outer periphery of the rotor 22 is omitted. The stator 12 has the stator core 3, which has a multiple of teeth 48 and a multiple of slots (not shown), and an armature winding (not shown) wound around the teeth 48 and housed in the slots.

Rather than being a perfect circle centered on the shaft 24, the rotor core 23 in the first embodiment has a floral form, and a multiple of slits 41 are formed in a field pole 40 of the rotor core 23 in which the permanent magnet 25 is embedded. The field pole 40 has a radius smaller than an arc centered on the shaft 24, which is attached on an inner side of the rotor 22. Also, of the multiple of slits 41, a central slit B in a center of the field pole 40 is such that a longitudinal axial direction (longitudinal direction) thereof is disposed in a radial direction of the rotor core 23 or a radial direction of an outer periphery of the floral form field pole 40.

Also, the rotor core 23 of the field pole 40 is between the slits 41, and central lines 42 between the slits 41 are set so as to spread farther apart the nearer the central lines 42 come to an outer peripheral side. That is, the slits 41 are provided so that an interval between a first central line 42a between the slits 41 and a second central line 42b between the neighboring slits 41 gradually increases as the first central line 42a and the second central line 42b head toward the outer peripheral side of the rotor 22. For example, seven slits 41 are disposed in each field pole 40 (=one magnetic pole portion). Also, an odd number of slits 41 are disposed axisymmetrically sandwiching the central slit B disposed in the center of the field pole 40, and lengths of the slits 41 are axisymmetrically the same. A circumferential direction width of the permanent magnet 25 is greater than a radial direction width, and the permanent magnet 25 is of a flat plate magnet form.

Also, a connection portion 44 is provided in order to integrate the field pole 40 divided by the slits 41. The field pole 40 divided by the slits 41 is integrated by the connection portion 44. The connection portion 44 is configured of a connection portion (field pole upper side) 44*a* or a connection portion (field pole lower side) 44*b*.

Figure 2C:
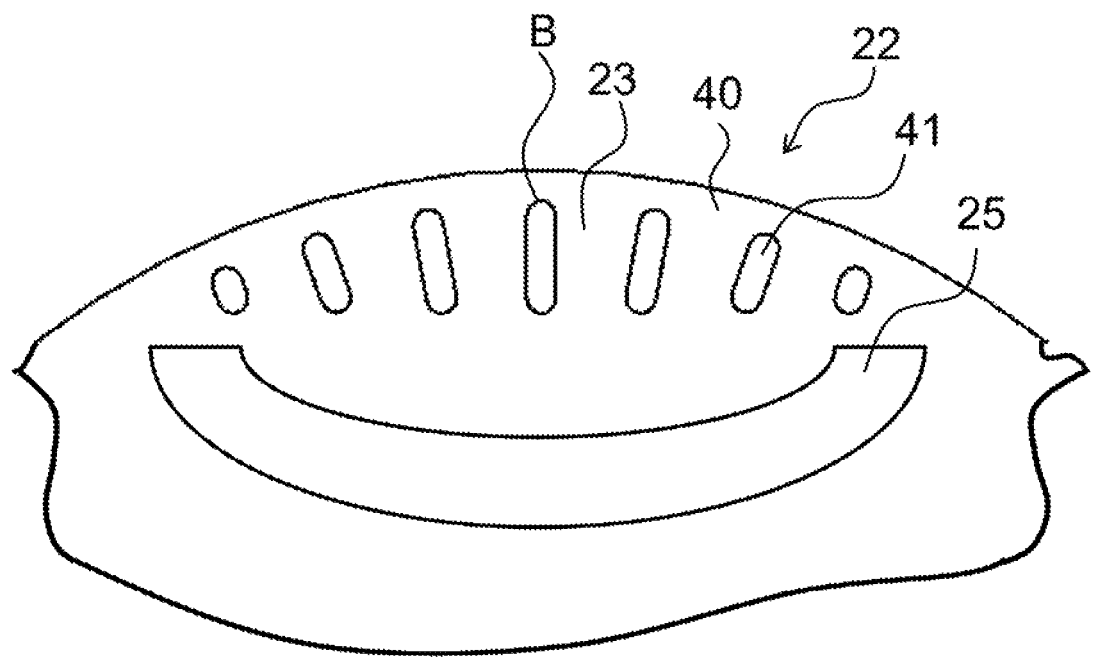
FIG. 2C is a front view of the rotor of the permanent magnet motor according to the first embodiment.
Figure 2D:
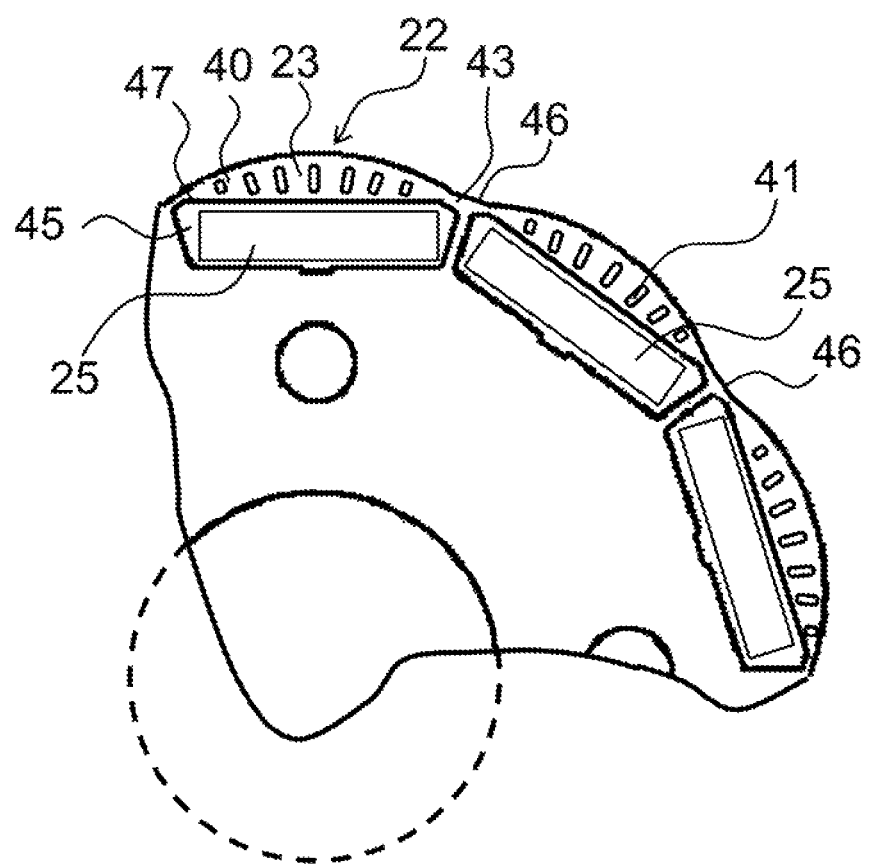
FIG. 2D is a front view of the rotor of the permanent magnet motor according to the first embodiment.
Figure 2E:
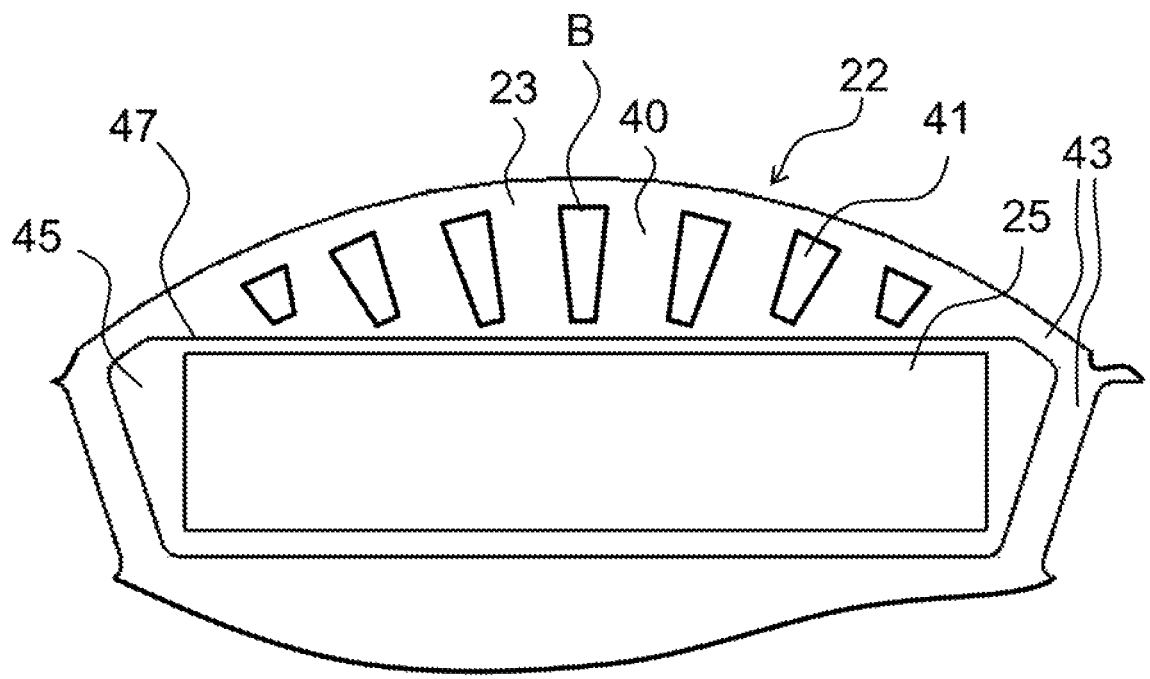
FIG. 2E is a front view of the rotor of the permanent magnet motor according to the first embodiment.

Also, FIG. 2C to FIG. 2E are front views of a rotor of a permanent magnet motor that is another example according to the first embodiment. In FIG. 2C, a form of the permanent magnet 25 is a curved form, but structures excepting the permanent magnet 25 and a form of a permanent magnet mounting hole are the same as the structures in FIG. 2A.

Further still, in FIG. 2D, a form of the rotor core 23 opposing a bridge portion 43 is a perfectly circular form 46, but structures excepting this form are the same as the structures in FIG. 2A.

Also, in FIG. 2E, a form of the slit 41 is trapezoidal, but structures excepting the form of the slit 41 are the same as the structures in FIG. 2A.

Figure 3:
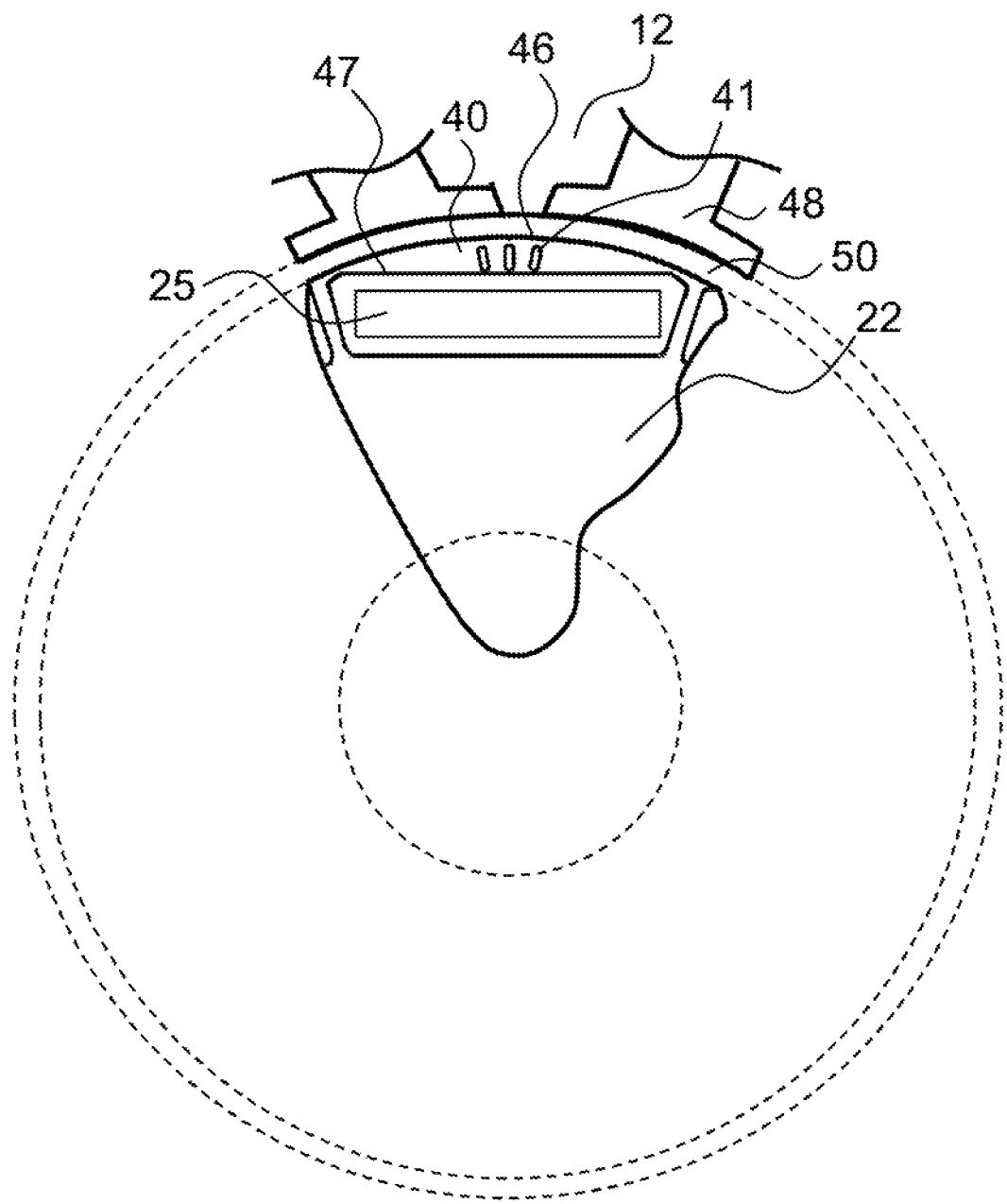
FIG. 3 is a front view of a permanent magnet motor in a comparative example.
Figure 4:
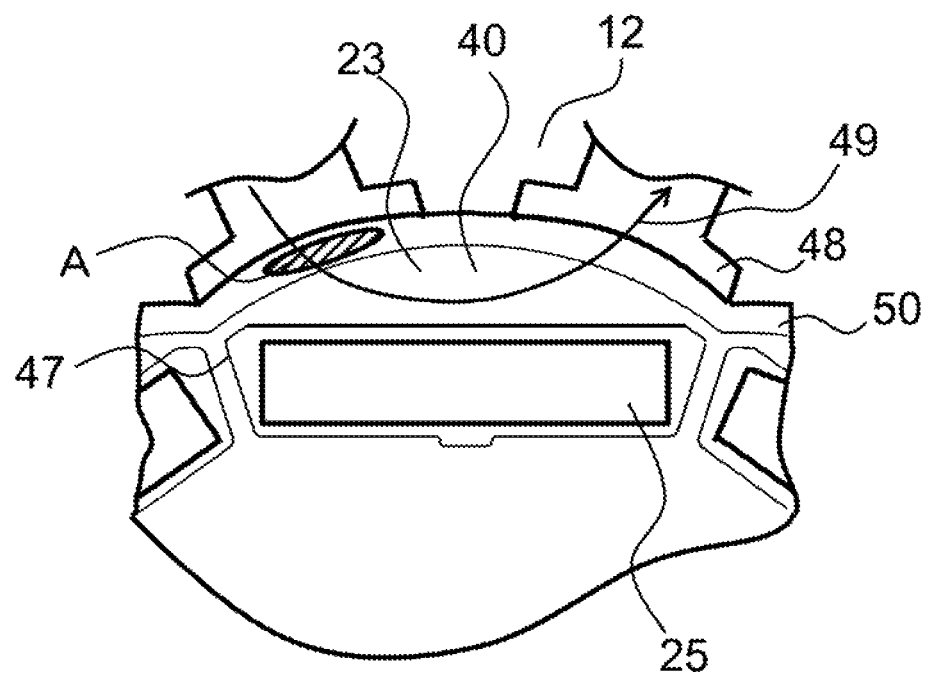
FIG. 4 is a front view of a permanent magnet motor in a comparative example.
Figure 5:
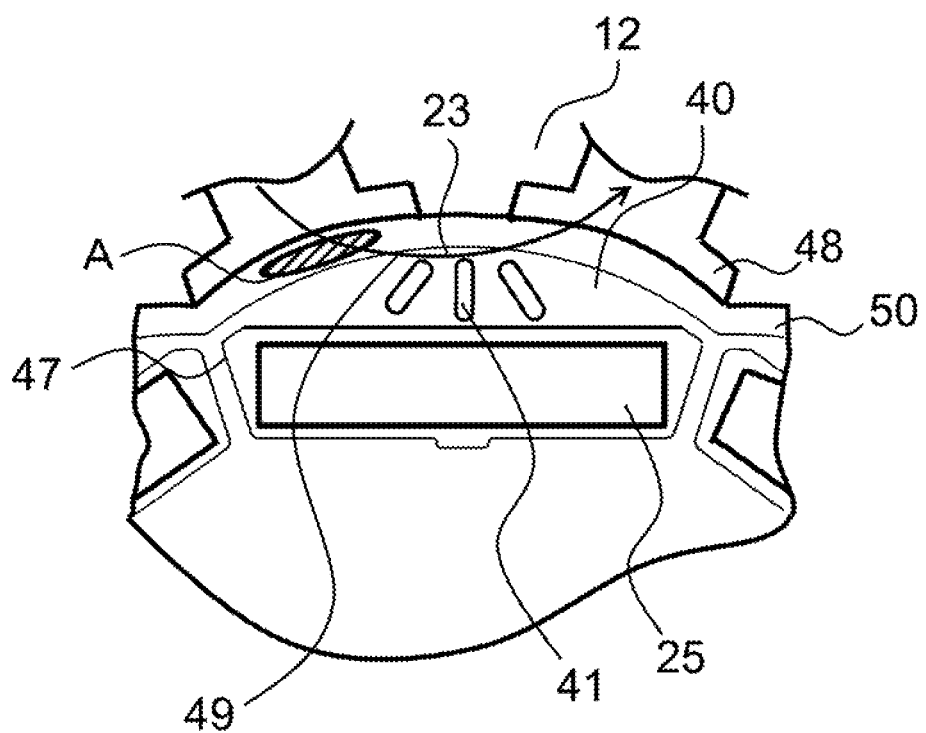
FIG. 5 is a front view of a permanent magnet motor in a comparative example.

FIG. 3 to FIG. 5 are front views of a permanent magnet motor in a comparative example. FIG. 3 to FIG. 5 show the teeth 48 of the stator 12 provided across the air gap 50 on the outer side of the rotor 22. In FIG. 3, the external form of the rotor 22 is the perfectly circular form 46, because of which torque ripple increases. Also, in FIG. 4, no slit 41 is provided in the rotor core 23, because of which a magnetic flux 49 crossing the field pole 40 of the rotor core 23 flows, and magnetic flux density in a region A of the air gap 50 increases. Also, in FIG. 5, the intervals between the slits 41 become smaller the nearer to the outer peripheral side of the rotor core 23, and there is no longer an advantage of the magnetic flux density of the air gap 50 being dispersed because of the slits 41.

Meanwhile, in the first embodiment, a particularly noticeable advantage can be exhibited with poles and slots such as 10 poles and 12 slots, 14 poles and 12 slots, or 14 poles and 18 slots, wherein a mode such that a low order electromagnetic excitation force mode is small and vibration noise is liable to increase, for example, a secondary mode all round, occurs.

One of the slits 41 is in the center of the field pole 40. The center of the field pole 40 is the place in which a sectional area of the field pole 40 with respect to the crossing magnetic flux 49 is greatest and the magnetic flux 49 flows most easily, and an advantage in that the magnetic flux 49 is interrupted by the slit 41 is obtained.

Also, the number of slits 41 formed in the field pole 40 is desirably five to seven per field pole 40 (=one magnetic pole portion) in a case of, for example, 10 poles and 12 slots and a diameter of in the region of 40 to 50. The reason is that when increasing the number of slits 41 until magnetic saturation occurs in the field pole 40, an advantage of restricting vibration noise is easily obtained, but the slits 41 form magnetic resistance, and torque decreases. Also, another reason is that when considering a circumferential direction width of the field pole 40, a slit width, and a slit interval (an interval in the region of the thickness of the electromagnetic steel plates of the rotor core 23 is needed), forming more than five to seven slits when punching with a press or the like to fabricate the slits 41 is difficult, and the like.

Figure 6A:
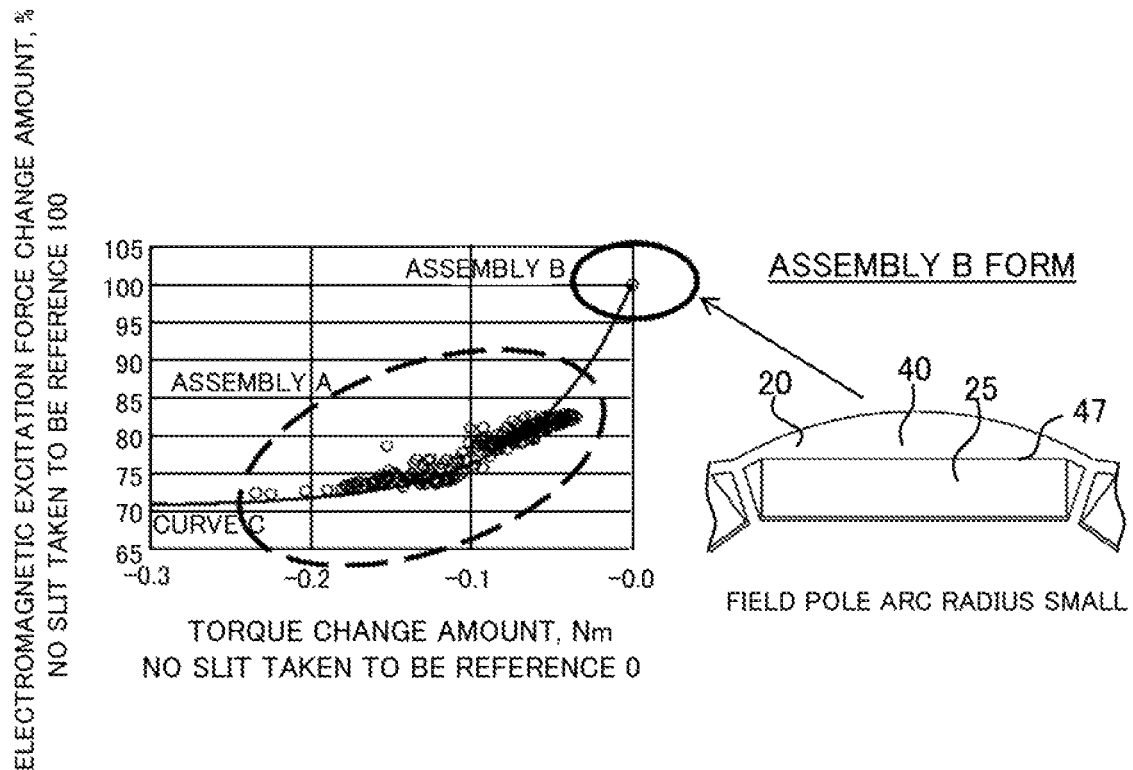
FIG. 6A is a drawing showing changes in electromagnetic excitation force and torque when slits are provided in a field pole.
Figure 6B:
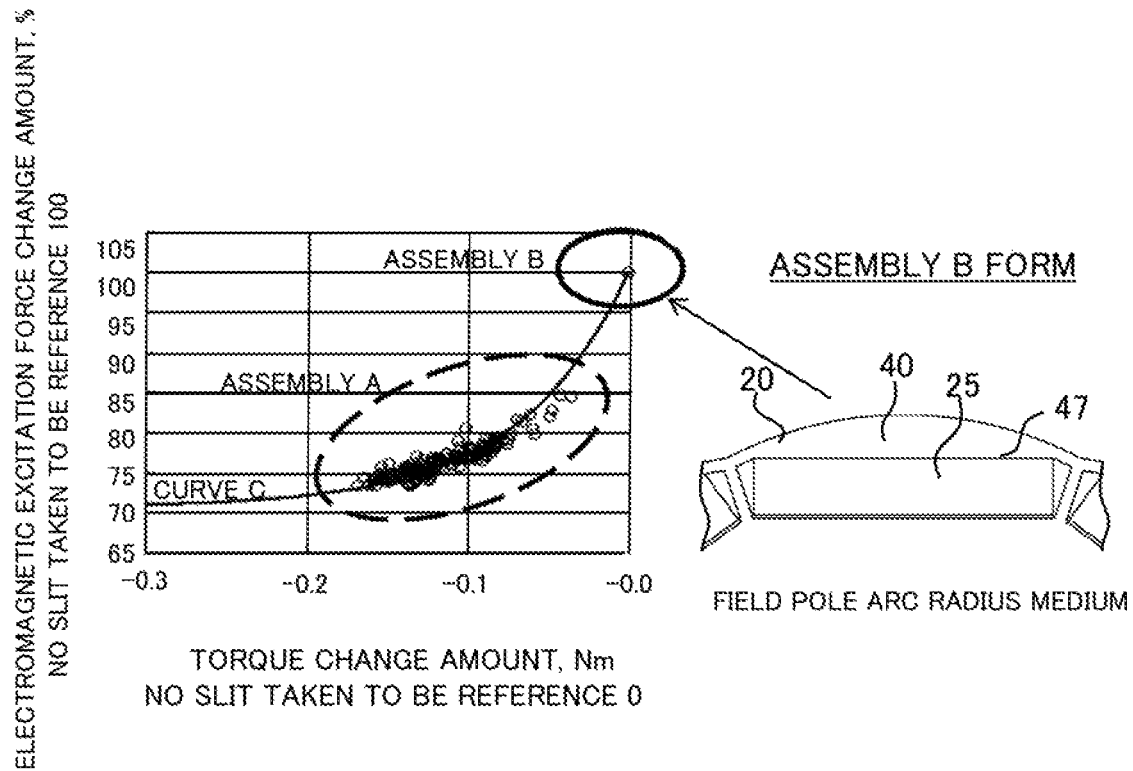
FIG. 6B is a drawing showing changes in electromagnetic excitation force and torque when slits are provided in the field pole.
Figure 6C:
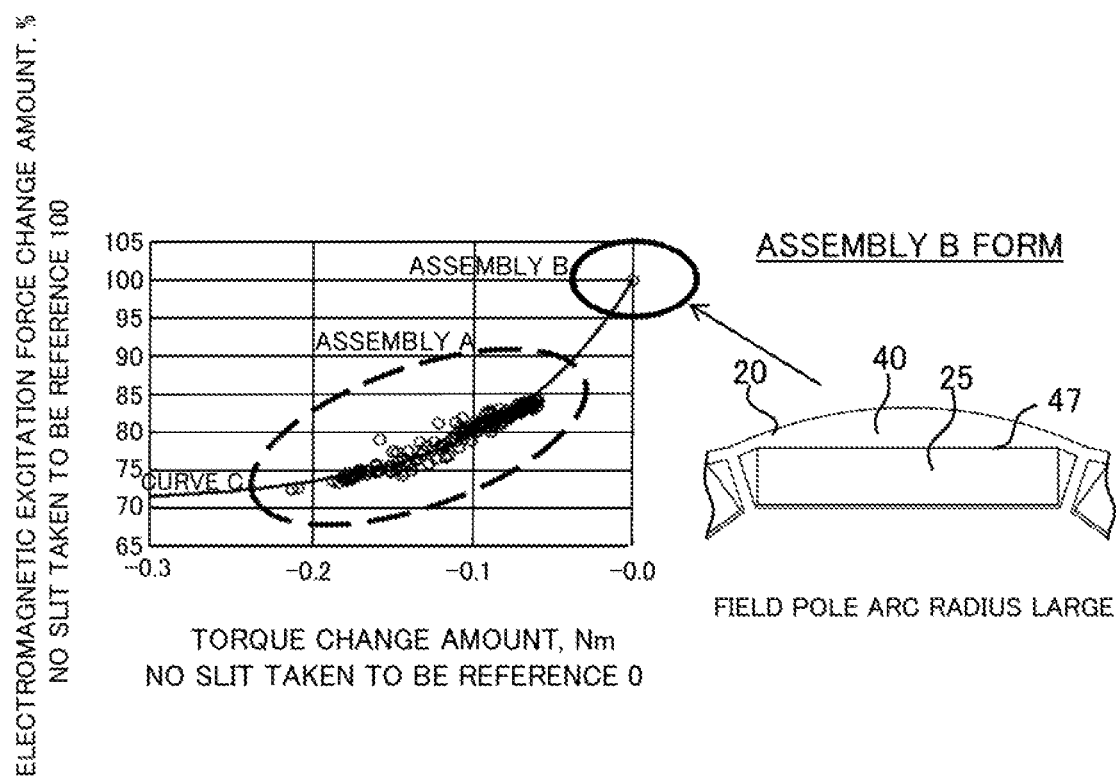
FIG. 6C is a drawing showing changes in electromagnetic excitation force and torque when slits are provided in a field pole.

FIG. 6A to FIG. 6C are drawings wherein amounts of change in electromagnetic excitation force and torque in a structure when slits are provided in a field pole and amounts of change in electromagnetic excitation force and torque in a structure (an assembly B) wherein slits are not provided in a field pole are plotted. In FIG. 6A to FIG. 6C, a graph on which the amounts of change in electromagnetic excitation force and torque are plotted is shown on the left side, and a front view of a form of the assembly B, wherein slits are not provided in the field pole, is shown on the right side. Also, FIG. 7 is a front view of a rotor of a permanent magnet motor according to the first embodiment.

Figure 7:
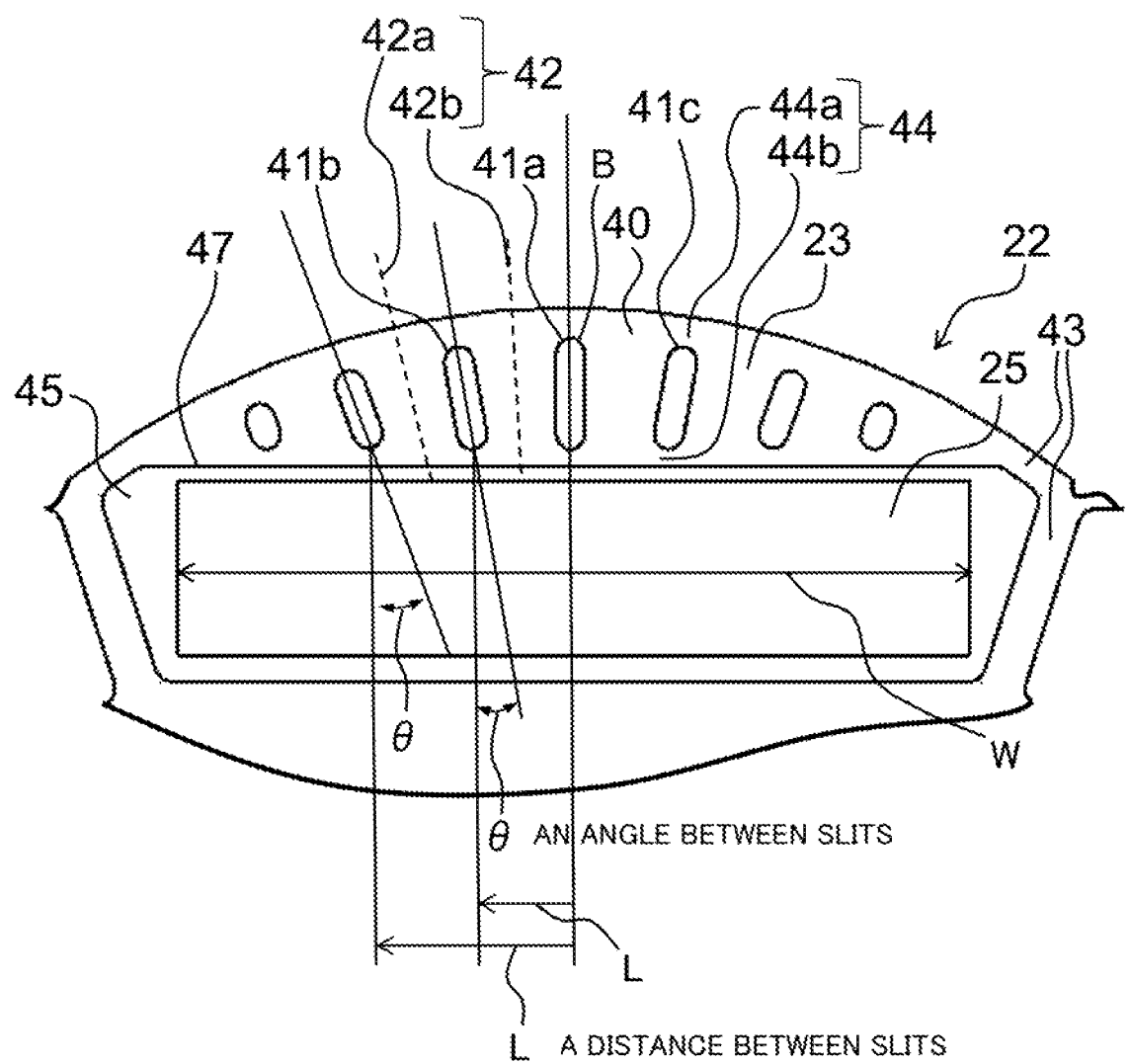
FIG. 7 is a front view of a rotor of the permanent magnet motor according to the first embodiment.

To describe more specifically, an assembly A with specifications designed using an optimum design tool of electromagnetic field analysis wherein five or seven slits 41 are disposed in the 10 pole, 12 slot motor 1 shown in FIG. 7, and a position (a distance L between slits) and an angle θ of the slits 41 are caused to change, so that a secondary component (a component causing transformation to an ellipse), which is a main component of electromagnetic excitation force that causes vibration noise in the stator core 3 or the frame 11, is minimal, and the assembly B with specifications such that the slit 41 is not disposed in the field pole 40, which is the reference for slit design, are plotted in FIG. 6A to FIG. 6C.

In FIG. 6A to FIG. 6C, a vertical axis shows an electromagnetic excitation force change rate, and a horizontal axis shows an amount of torque change. With an electromagnetic excitation force value of the assembly B, which has no slit 41, as 100, the vertical axis shows as a percentage (%) to what level the electromagnetic excitation force can decrease with respect to 100 owing to slit design. Also, with a torque amount of the assembly B, which has no slit 41, as 0, the horizontal axis shows to what extent the torque amount changes owing to slit design.

Also, the assembly B, with the specifications that are the reference for slit design, is such that some forms of the rotor 22 from an almost perfectly circular form to a practically floral form are selected by changing the arc radius of the field pole 40, and taken to be proof showing that a tendency to be described below has universality, regardless of the design of the assembly B. Specifically, the form of the assembly B shown on the right side of FIG. 6A corresponds to, for example, the floral form rotor 22 wherein the arc radius of the field pole 40 is small. Also, the form of the assembly B shown on the right side of FIG. 6C corresponds to, for example, the rotor 22 with the almost perfectly circular form wherein the arc radius of the field pole 40 is large. Also, the form of the assembly B shown on the right side of FIG. 6B corresponds to the rotor 22 having an arc radius of the field pole 40 midway between the form of the assembly B shown on the right side of FIG. 6A and the form of the assembly B shown on the right side of FIG. 6C.

FIG. 6A to FIG. 6C are drawings wherein torque-electromagnetic excitation force curves C joining the assemblies B shown in FIG. 6A to FIG. 6C and assemblies A designed with slits based on each assembly B are plotted as exponential functions using the least squares method. Each curve C is a curve that gradually approaches 71%, and shows that electromagnetic excitation force can be considerably reduced by slit design to a maximum of a 71% level. Also, when an electromagnetic excitation force corresponding to a general time constant that is an index indicating a convergence speed from the assembly B that is the reference to 71% is taken to be 81% or less, it can be said that the electromagnetic excitation force can converge to a sufficiently small value in the assembly A owing to slit design.

Figure 8:
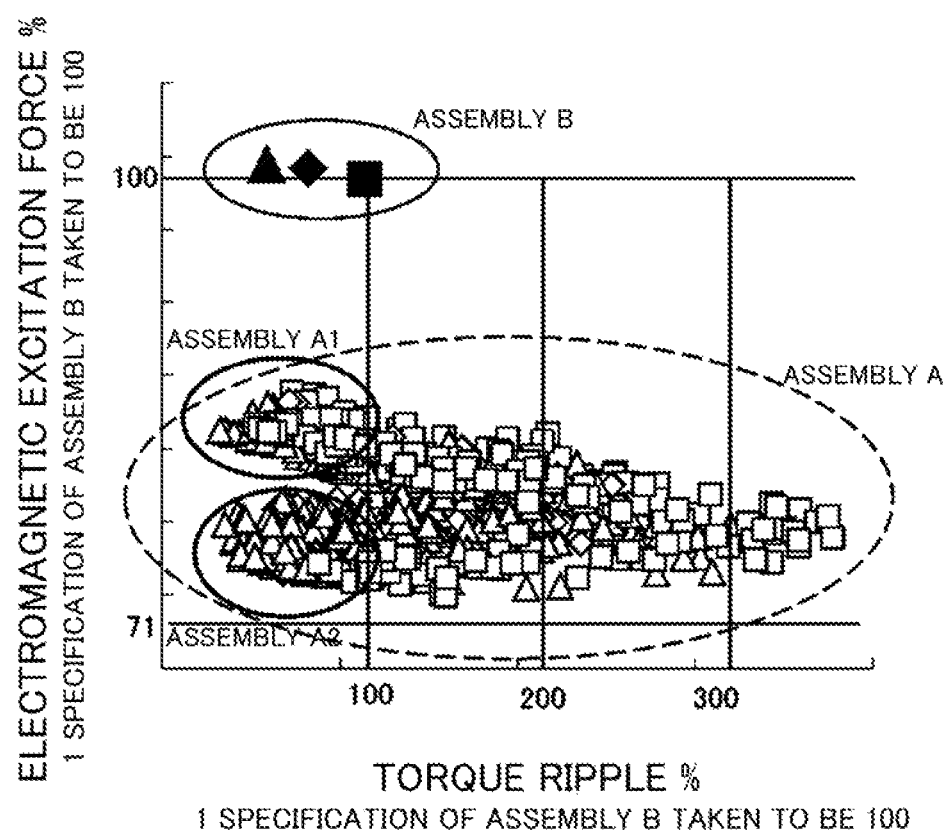
FIG. 8 is a drawing wherein analysis values obtained using

FIG. 8 is a drawing wherein analysis values obtained using the specifications of each of FIG. 6A to FIG. 6C are plotted, with a vertical axis as electromagnetic excitation force and a horizontal axis as a torque ripple value. In FIG. 8, triangular, diamond, and square plotting forms shown in assembly B are the form of one of the assemblies B, in which no slit is provided in the field pole 40, shown on the right side in FIG. 6A to FIG. 6C, but no particular correspondence relation between the plotting form and the form of the assembly B is specified here. The same applies to the assembly A.

It is found that the assembly A is an assembly such that torque ripple decreases and also, conversely, worsens with respect to the assembly B, in which no slit 41 is provided in the field pole 40, as shown in FIG. 8. Torque ripple worsening in comparison with the assembly B, which is the reference, due to slit design is because no balance is achieved between electromagnetic excitation force and torque ripple, and vibration noise caused by frame vibration and shaft vibration cannot be restricted, and it goes without saying that specifications such that torque ripple is equal to or less than that of the assembly B are specifications such that a clear advantage of achieving a balance between electromagnetic excitation force and torque ripple is obtained. Furthermore, to focus on this point, it is clear that the plotted data are divided into an assembly A1, wherein the electromagnetic excitation force value is somewhat high, and an assembly A2.

Figure 9:
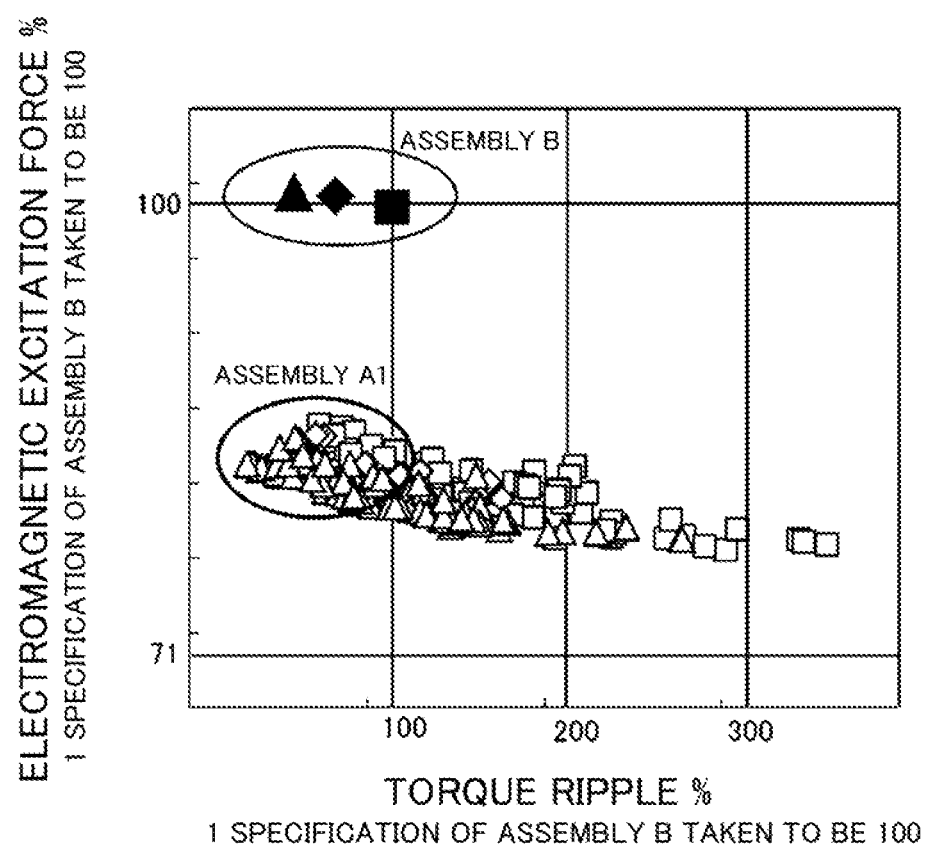
FIG. 9 is a drawing wherein data corresponding to a second slit and a third slit neighboring a first slit being disposed in positions greater than 20% with respect to a circumferential direction width of a permanent magnet are separated from the data plotted in FIG. 8 and replotted.

FIG. 9 is a drawing wherein data corresponding to a second slit 41*b* and a third slit 41*c* neighboring a first slit 41*a* in the rotor 22 shown in FIG. 7 being disposed in positions greater than 20% with respect to a circumferential direction width W of the permanent magnet 25 are separated from the data plotted in FIG. 8 and replotted. Also, FIG. 10 is a drawing wherein data corresponding to the second slit 41*b* and the third slit 41*c* neighboring the first slit 41*a* in the rotor 22 shown in FIG. 7 being disposed in positions within 20% with respect to the circumferential direction width W of the permanent magnet 25 are separated from the data plotted in FIG. 8 and replotted.

Figure 10:
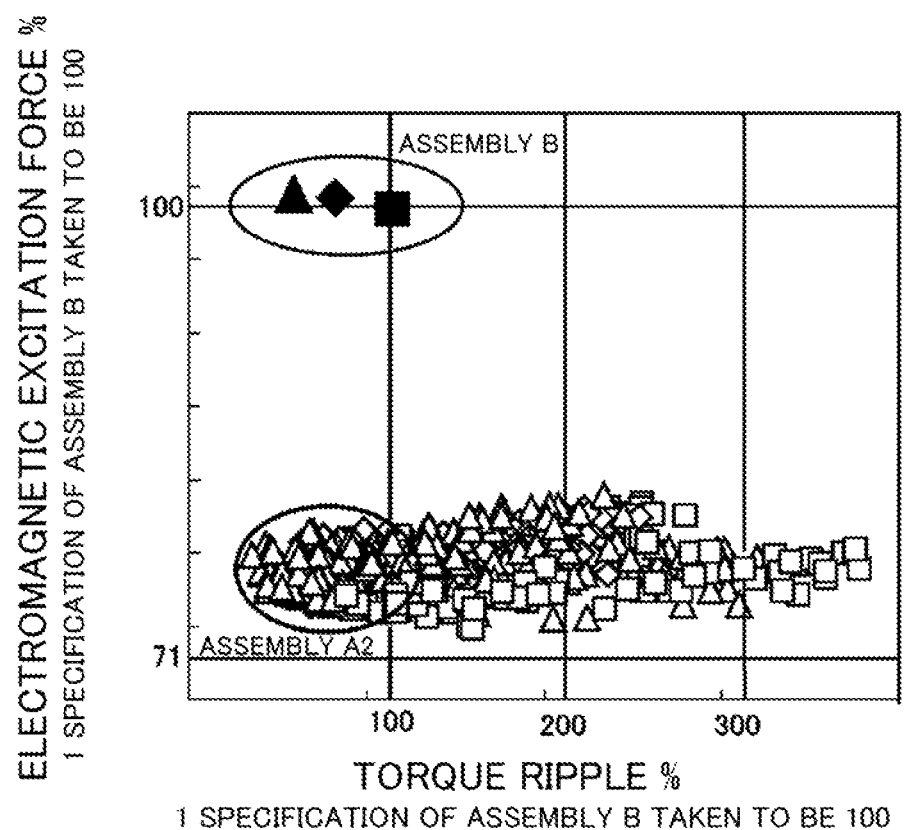
FIG. 10 is a drawing wherein data corresponding to the second slit and the third slit neighboring the first slit being disposed in positions within 20% with respect to the circumferential direction width of the permanent magnet are separated from the data plotted in FIG. 8 and replotted.

Herein, when data wherein distances L are each set so that the second slit 41*b* and the third slit 41*c* neighboring the first slit 41*a* in the rotor 22 shown in FIG. 7 are disposed in positions greater than 20% with respect to the circumferential direction width W of the permanent magnet 25 are separated and replotted in FIG. 9, and data wherein the distances L are each set so that the second slit 41*b* and the third slit 41*c* are disposed in positions within 20% are separated and replotted in FIG. 10, it is clear that FIG. 8 depends on the dispositions of the second slit 41*b* and the third slit 41*c* with respect to the magnet width W.

That is, according to the first embodiment, the previously undifferentiated assembly A1 and assembly A2 can be differentiated between by focusing on achieving a balance between electromagnetic excitation force and torque ripple, and specifications such that electromagnetic excitation force can be further reduced can be selected.

The first embodiment is such that, taking 20% with respect to the circumferential direction width W of the permanent magnet 25 as a threshold, torque ripple is reduced, and a form of the rotor 22 that reduces electromagnetic excitation force can be adopted, by the first slit 41*a* disposed in a central position of the field pole 40, and the second slit 41*b* and the third slit 41*c* disposed on either side of the first slit 41*a*, being disposed within 20% of the circumferential direction width of the permanent magnet 25. As a result of this, the motor 1 according to the first embodiment is such that a worsening of vibration noise can be reduced.

Also, the multiple of slits 41 are disposed so that electromagnetic excitation force, which forms a main component when a spatial order is a minimum order of two or more, decreases to 81% or less with respect to a case where a rotor core with no slit is adopted as a reference. Further still, the multiple of slits 41 are disposed in a state such that torque ripple is equal to or less than the torque ripple of a rotor core with no slit with respect to a case where the rotor core with no slit is adopted as a reference.

Embodiments can be combined, and each embodiment can be modified or eliminated as appropriate.

REFERENCE SIGNS LIST

1 motor, 2 lead wire, 3 stator core, 4 insulator, 5 stator winding, 6 terminal holder, 7 winding terminal, 8 connection terminal, 9 connection terminal base portion, 10 nut, 11 frame, 12 stator, 13 rear bearing box portion, 14 spigot joint portion, 15 flange portion, 16 frame grommet, 17 housing, 18 front bearing box, 19 resolver, 20 resolver mounting portion, 21 mounting spigot joint portion, 22 rotor, 23 rotor core, 24 shaft, 25 permanent magnet, 26 rear bearing, 27 front bearing, 28 boss, 40 field pole, 41 slit, 41*a* first slit, 41*b* second slit, 41*c* third slit, 42 central line, 42*a* first central line, 42*b* second central line, 43 bridge portion, 44 connection portion, 44*a* connection portion (field pole upper side), 44*b* connection portion (field pole lower side), 45 gap portion, 46 perfectly circular form, 47 permanent magnet mounting hole, 48 teeth, 49 magnetic flux, 50 air gap

The invention claimed is:

1. A permanent magnet motor, comprising:
    a stator; and
    a rotor disposed opposing an inner side of the stator and having a field pole of a rotor core in which a permanent magnet is embedded, wherein
    the field pole has a radius smaller than an arc centered on a shaft of the rotor,
    a multiple of slits are formed in the field pole, the multiple of slits are disposed so that an interval between a first central line positioned between a multiple of the slits and a second central line positioned between a neighboring multiple of the slits increases as the first central line and the second central line head toward an outer peripheral side of the rotor core, and
    of the multiple of slits of the field pole, a first slit disposed in a central position of the field pole, and a second slit and a third slit disposed on either side of the first slit, are disposed within 20% of a circumferential direction width of the permanent magnet.

2. The permanent magnet motor according to claim 1, wherein the second and third slits are disposed axisymmetrically with respect to the first slit.

3. The permanent magnet motor according to claim 2, wherein an external form of the rotor is a floral form.

4. The permanent magnet motor according to claim 2, wherein the multiple of slits are disposed so that electromagnetic excitation force, which forms a main component when a spatial order is a minimum order of two or more, decreases to 81% or less with respect to a case where the rotor core that has no slit is adopted as a reference.

5. The permanent magnet motor according to claim 2, wherein the multiple of slits are disposed in a state such that torque ripple is equal to or less than torque ripple of the rotor core that has no slit with respect to a case where the rotor core that has no slit is adopted as a reference.

6. The permanent magnet motor according to claim 1, wherein an external form of the rotor is a floral form.

7. The permanent magnet motor according to claim 6, wherein the multiple of slits are disposed so that electromagnetic excitation force, which forms a main component when a spatial order is a minimum order of two or more, decreases to 81% or less with respect to a case where the rotor core that has no slit is adopted as a reference.

8. The permanent magnet motor according to claim 6, wherein the multiple of slits are disposed in a state such that torque ripple is equal to or less than torque ripple of the rotor core that has no slit with respect to a case where the rotor core that has no slit is adopted as a reference.

9. The permanent magnet motor according to claim 1, wherein the multiple of slits are disposed so that electromagnetic excitation force, which forms a main component when a spatial order is a minimum order of two or more, decreases to 81% or less with respect to a case where the rotor core that has no slit is adopted as a reference.

10. The permanent magnet motor according to claim 9, wherein the multiple of slits are disposed in a state such that torque ripple is equal to or less than torque ripple of the rotor core that has no slit with respect to a case where the rotor core that has no slit is adopted as a reference.

11. The permanent magnet motor according to claim 1, wherein the multiple of slits are disposed in a state such that torque ripple is equal to or less than torque ripple of the rotor core that has no slit with respect to a case where the rotor core that has no slit is adopted as a reference.

* * * * *